US005520309A

United States Patent [19]

Roth

[11] Patent Number: 5,520,309

[45] Date of Patent: May 28, 1996

[54] CHALK DISPENSER

[76] Inventor: Alfred C. Roth, 2388 Yost Blvd., Ann Arbor, Mich. 48104

[21] Appl. No.: 232,680

[22] Filed: Apr. 25, 1994

[51] Int. Cl.$^{6}$ .................... B65G 59/00

[52] U.S. Cl. .................... 221/197; 221/281; 221/283; 221/303

[58] Field of Search .................... 221/155, 197, 221/281, 282, 283, 287, 303, 305; 312/45, 72, 73; 206/214

[56] References Cited

U.S. PATENT DOCUMENTS

| | | | |
|---|---|---|---|
| 1,628,439 | 5/1927 | Staubly | 221/305 |
| 2,257,584 | 9/1941 | Wyllie | 221/283 |
| 3,164,298 | 1/1965 | Repko | 221/282 |
| 3,300,087 | 1/1967 | Kuypers | 221/197 |
| 4,767,022 | 8/1988 | Oldorf | 221/305 |
| 5,351,840 | 10/1994 | Visco et al. | 211/69.1 |
| 5,379,915 | 1/1995 | Hudspeth et al. | 221/281 |

FOREIGN PATENT DOCUMENTS

| | | | |
|---|---|---|---|
| 1059684 | 3/1954 | France | 312/45 |
| 1159022 | 6/1958 | France | 221/282 |

*Primary Examiner*—H. Grant Skaggs
*Attorney, Agent, or Firm*—Howard & Howard

[57] ABSTRACT

A chalk dispenser for containing and dispensing chalk. In one embodiment, the chalk dispenser is in the shape of a box and has a partially closed bottom, with laterally opening sides so that individual pieces of chalk can be pushed or pulled from the bottom. The bottom is preferably concave shaped to be complimentary to the shape of the chalk being dispensed. A window is provided in the front of the dispenser so that the level of chalk can be determined. In a second embodiment, a plurality of parallel channels are provided into which individual pieces of chalk can be inserted. The channels are preferably concave in shape with slots so that the chalk can be contacted by a user and slid out of the channel. The channels have a length which is slightly less than the length of the chalk so that the ends of the chalk can be grasped by a user and pulled or pushed from the channels.

9 Claims, 1 Drawing Sheet

Fig - 3
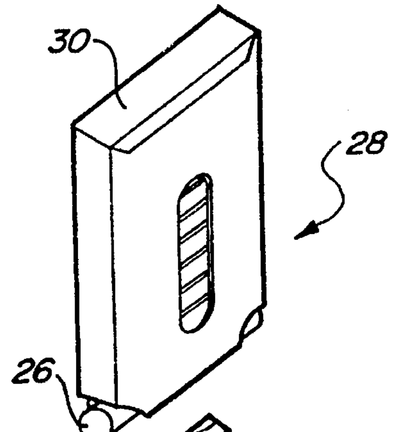
Fig - 5
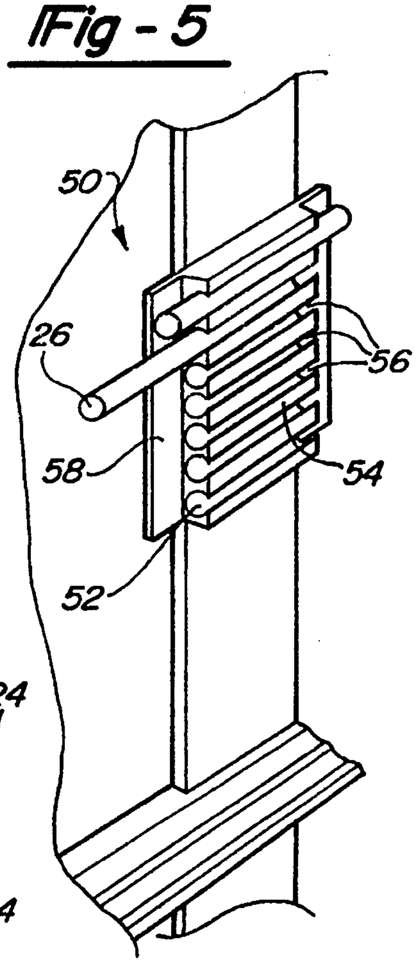
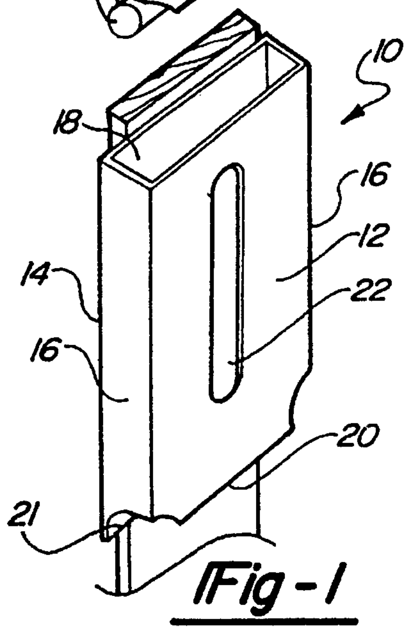
Fig - 1
Fig-2
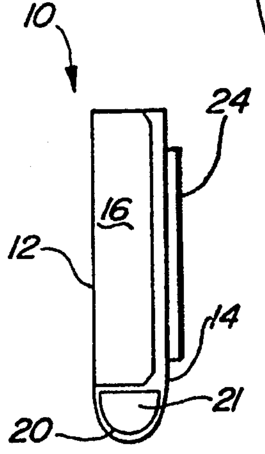
Fig - 4
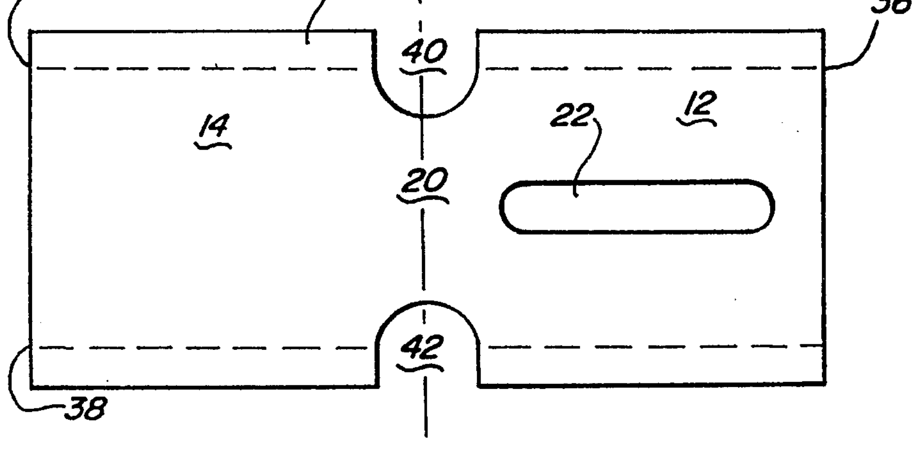

CHALK DISPENSER

BACKGROUND

The present invention relates to chalk dispensers and, more particularly, to chalk dispensers that can be attached to a chalkboard and can store several pieces of chalk for easy dispensing.

A major problem with chalkboards is the lack of chalk. The only known method of keeping chalk near a chalkboard is to put it in the chalk tray attached to the chalkboard. Frequently, when chalk is needed, it is either not in the tray or what is in the tray is so small that it cannot easily be used. This leaves the user scrounging about trying to find a box of chalk. Additionally, even when there is chalk in the tray, it is susceptible to being broken. As anyone who has used a chalkboard knows, chalk can easily be knocked out of the tray and broken.

The above problems of unavailable chalk and easily broken chalk are not only aggravating to the user, but are expensive. Many times, when chalk is not available, the user gets another box, which ultimately gets misplaced without all the chalk being used or spread out on the chalk tray and eventually broken or lost. When this process is repeated a number of times by a number of users, the economic loss can be substantial.

SUMMARY OF THE INVENTION

The present invention overcomes the above problems by providing a chalk dispenser that can be mounted near the chalkboard and can hold a box of chalk. The chalk is visible in the dispenser and can be removed from the dispenser one piece at a time. The dispenser ensures the availability of chalk and protects the chalk.

In one embodiment, the dispenser includes a container for containing and dispensing the chalk. The container is generally rectangular, with the width and depth being generally equal to one another and slightly greater than the diameter of one piece of chalk. The length of the container is preferably long enough to hold a number of pieces of chalk and, ideally, an entire box of chalk.

The container has an open top for receipt of the chalk so that the chalk can be stacked in the dispenser. The bottom of the dispenser has a partially closed bottom for supporting the chalk. The partially closed bottom has opposed open ends so that the chalk can be laterally removed from the container bottom.

In the preferred embodiment, the front of the dispenser has a viewing window for visually determining the amount of chalk left in the container. The back side of the dispenser has attaching means for mounting the chalk dispenser. In the preferred embodiment, the attaching means is a self-adhesive pad, with a peel-away cover.

In a second embodiment, the chalk dispenser has a plurality of parallel spaced channels with each channel having a longitudinal length that is less than the length of the chalk and a diameter that is slightly greater than the diameter of the chalk. The chalk can be inserted lengthwise into a respective channel and removed lengthwise from the same channel.

Preferably, in this embodiment, each channel has an open top or a longitudinal slot adapted to expose the chalk so that it can be contacted through the opening and pushed from the channel. Additionally, as stated above, the channel has a longitudinal length that is less than the longitudinal length of the chalk so that the ends of the chalk can be contacted to pull or push the chalk from the dispenser.

DESCRIPTION OF THE DRAWINGS

FIG. 1 is a perspective view of one embodiment of the chalk dispenser of the present invention.

FIG. 2 is a side view of FIG. 1.

FIG. 3 is a perspective view of a chalk cartridge.

FIG. 4 is a plan view of the pre-cut material used to assemble the dispenser of FIG. 1.

FIG. 5 is a perspective view of the second embodiment of the present invention.

DETAILED DESCRIPTION OF THE INVENTION

With reference to FIG. 1, the first embodiment of the chalk dispenser of the present invention is shown generally at 10. The dispenser is generally a rectangular box having a front 12, back 14, sides 16, a top 18 and a bottom 20. The dispenser 10 is shown mounted to the edge of a standard chalkboard.

The front of the dispenser includes a viewing window 22 for easily viewing the amount of chalk within the dispenser. With a quick glance, a user can determine if there is chalk available. With reference to FIG. 2, the back of the dispenser has a peel-away-type adhesive mounting pad 24 that allows the dispenser to be mounted to or next to a chalkboard for easy access (see FIG. 1). It should be appreciated that the pad 24 is the preferred method of attaching the dispenser, but those of ordinary skill in the art will appreciate that there are numerous other methods for attaching the dispenser, for example, screws, velcro, hooks, etc.

The top 18 of the dispenser is preferably open to easily receive sticks 26 of chalk. The chalk sticks 26 can be inserted individually or as illustrated in FIG. 3, a cartridge 28 can be used. In the preferred embodiment, the cartridge 28 is shaped to be complimentary to the dispenser 10. The cartridge of the preferred embodiment includes the same front, back, side, and bottom as the dispenser 10; but, as illustrated, the cartridge includes a top 30 that is closed. It should be understood by those of ordinary skill that other cartridge shapes could be used with the present invention.

With reference to FIG. 4, a pre-cut sheet of material is illustrated from which the chalk dispenser FIG. 1 is formed. The sheet of material shown generally at 32 can be folded about the lateral center line 34 and longitudinal side lines 36 and 38 to form dispenser 10. The bottom 20 is formed by actually rolling the area between panels 12 and 14 so that front panel 12 is generally parallel with the back panel 14. It is rolled so that the bottom 20 maintains a concave shape complimentary to the cylindrical shape of the chalk stick 26. Concave recesses 40 and 42 extend toward the longitudinal center line of the container and form the lateral openings 21 of the bottom 20. Window 22 is formed in the front panel 12 by slotting the front panel.

Preferably, the overall length of sheet 32 is 10 inches, with a width of approximately 4 ½ inches. The sides 16, which are formed by folding along side lines 36 and 38, are approximately ½ inch in width so that the folded sides are approximately ½ inch when the front panel 12 and back panel 14 are parallel. When the container is assembled, it has an overall height of about five inches, a width of approximately 3 ⅜ inches, and a depth of approximately ½ inch.

In order to use the dispenser, chalk sticks are placed in the top 18 and stacked as shown in FIG. 1. To remove a chalk stick, the chalk stick 26 is either pushed or pulled from the lateral openings 21. When the chalk stick is removed, the stack of sticks 26 drops down, making available the next chalk stick.

With reference to FIG. 5, a further embodiment of the chalk dispenser of the present invention is generally illustrated at 50. The chalk dispenser 50 has a plurality of parallel-spaced channels 52, with each channel having a diameter that is slightly greater than the diameter of the chalk, which can be inserted into the channel. The length of the channel is preferably shorter than the length of the chalk so that the chalk sticks out from the channels 52. In this way, the chalk can be grasped by a user and pulled out of a channel for use. However, to further facilitate dispensing chalk from dispenser 50, the face 54 of the dispenser is either open at or has a plurality of openings 56 communicating with channels 52. The openings have a width that is less than the diameter of the chalk. In this way, a user can touch the chalk through the openings 56 and slide the chalk from channels 52 for use. As illustrated, the channels 52 are mounted upon a base 58. As in the previous embodiment, the back of the base has a means for attaching the chalk dispenser 52 to or adjacent a chalkboard. In the preferred embodiment, it is a pad having an adhesive on it and a peel-away protective sheet, generally as shown in FIG. 2. As previously stated, other attaching means could be used.

Having described various preferred embodiments of the present invention, it should be realized by one of ordinary skill in the art that the chalk dispenser of the present invention may be modified without departing from the inventive concept I have set forth in the following claims.

What is claimed is:

1. A chalk dispenser for dispensing chalk, said chalk being generally cylindrical with its length being greater than its diameter, said chalk dispenser comprising:

a box for containing and dispensing chalk, said box having a front, back, sides and bottom defining a length, width and depth of said box, said depth being slightly greater than the diameter of said chalk, said width being substantially greater than the depth and slightly greater than the length of said chalk;

said box having an open top for receipt of chalk, said open top having a width slightly larger than the length of said chalk and a depth slightly larger than the diameter of said chalk such that said chalk can be inserted into said open top and stack within said box;

said box having a partially closed bottom for supporting said chalk within said box, said partially closed bottom extending from said front to said back of said box to define a support track for said chalk and extending laterally across said box a distance which is less than the width of said box to define opposed open ends which expose the ends of said chalk, said open ends having a diameter that is slightly greater than the diameter of said chalk with said chalk being laterally removed from said box through either said open ends.

2. The chalk dispenser of claim 1, wherein said front has a viewing window for visually determining the amount of chalk within said dispenser.

3. The chalk dispenser of claim 1, wherein said back has attaching means for mounting said chalk dispenser.

4. The chalk dispenser of claim 1, wherein said partially closed bottom has a generally concave surface.

5. The chalk dispenser of claim 1, wherein said box is formed from a single sheet of material.

6. The chalk dispenser of claim 1, wherein said box is formed from metal.

7. The chalk dispenser of claim 1, wherein said box is formed from plastic.

8. The chalk dispenser of claim 1, wherein said chalk is stacked within a cartridge, said cartridge being adapted to be inserted into said open top.

9. The chalk dispenser of claim 8, wherein said cartridge has a bottom complementary to said partially open bottom.

* * * * *